Oct. 8, 1940.  P. A. ABRAMOSKA  2,217,037

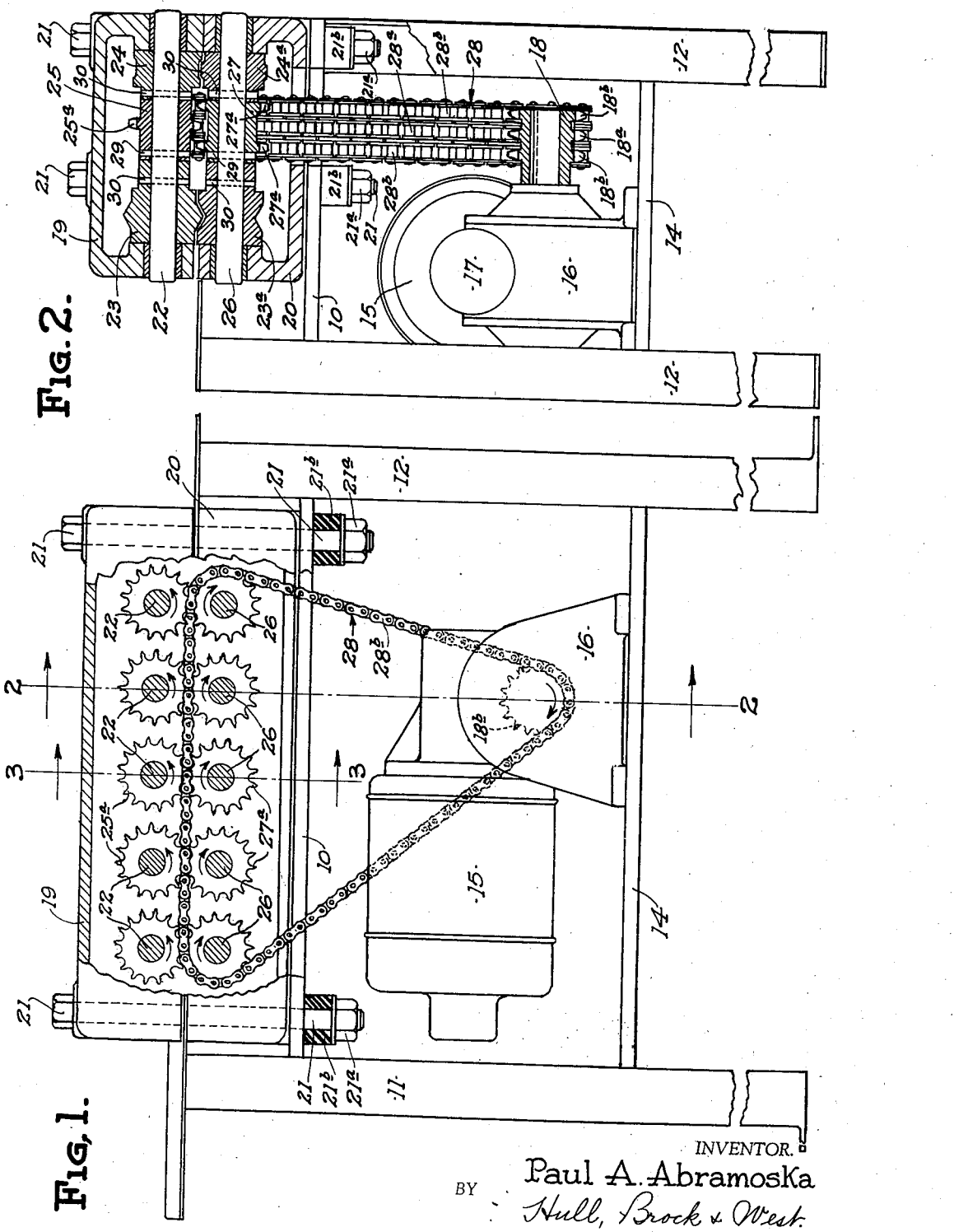

DRIVING MECHANISM

Filed Nov. 3, 1938   2 Sheets-Sheet 2

INVENTOR.
Paul A. Abramoska
BY Hull, Brock & West
ATTORNEYS.

Patented Oct. 8, 1940

2,217,037

UNITED STATES PATENT OFFICE 2,217,037

DRIVING MECHANISM

Paul A. Abramoska, Parma, Ohio

Application November 3, 1938, Serial No. 238,622

2 Claims. (Cl. 74—221)

Figure 3:
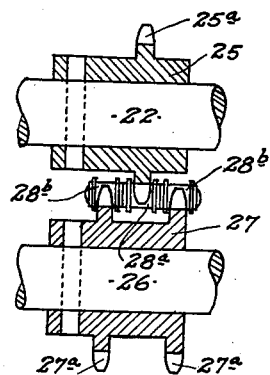

This invention relates to mechanism for driving the shafts of metal-shaping rolls, and particularly to mechanism for driving rolls which are adapted to bend or otherwise shape metal sheets. It has for its general object to reduce the expense of mechanisms heretofore used for this purpose; to simplify greatly the mechanism employed for this purpose; and to insure comparatively quiet operation thereof. I accomplish the foregoing objects, and other objects which will be set forth hereinafter, in and through the construction and arrangement of parts shown in the drawings hereof, wherein Fig. 1 represents a side elevation, with certain parts broken away, of a machine by means of which my invention is practiced; Fig. 2 a vertical sectional view through said machine, taken on the line 2—2 of Fig. 1; Fig. 3 an enlarged detail in section taken on the line 3—3 of Fig. 1, while Figs. 4-13 inclusive are views similar to Fig. 3 illustrating modifications of the driving mechanism shown in Figs. 1—3.

Describing the parts herein by reference characters, and first with reference to Figs. 1-3 inclusive, 10 denotes the bed of the machine, the same being supported by legs 11, 12 which in turn support, beneath the bed, a base 14 which carries a motor, the housings of which are shown at 15, 16, the motor being provided with a shaft 17 which in turn drives a shaft (not shown) within the motor casing 16, said shaft having attached thereto an extension provided with a sprocket hub 18. A worm drive is indicated as that employed for rotating the sprocket hub, such drive being preferred because of the fact that the parts will be driven at low speed.

A housing comprising an upper section 19 and a lower section 20 is secured to the bed 10, by means of bolts 21 provided beneath the bed with nuts 21$^a$ and yieldable bushings 21$^b$. Journaled in the upper housing section are shafts 22, each of said shafts being provided with metal shaping rolls 23 and 24 and with a sprocket gear 25 mounted thereon between the said rolls. Journaled in the lower housing section are shafts 26, arranged directly beneath the shafts 22 and each carrying shaping rolls 23$^a$ and 24$^a$ complementary to the rolls 23 and 24, respectively, and each being provided with a sprocket hub 27 located directly beneath the sprocket hub 25 on the shaft thereabove. In the embodiment of my invention shown in Figs. 1—3, each upper sprocket hub is a single sprocket, the teeth 25$^a$ whereof are arranged midway between the ends thereof while each sprocket 27 is a double sprocket, the teeth 27$^a$ of which are located adjacent to the ends of the hub.

The sprocket hub 18 is provided with a triple sprocket comprising a centrally arranged sprocket 18$^a$ and end sprockets 18$^b$.

28 denotes generally a triple sprocket chain comprising a middle chain member 28$^a$ and side chain members 28$^b$, said members being adapted to be driven respectively by the sprockets 18$^a$ and 18$^b$ and to be received between and to engage the vertically opposed sprockets on the shafts 22 and 26. The sprockets and the rolls are secured to their respective shafts by pins 29 and 30, respectively. As illustrated herein, the middle chain member 28$^a$ is driven by the middle sprocket 18$^a$ and engages the sprockets 25$^a$ on the hubs 25 while the side chain members are driven by the sprockets 18$^b$ and engage the sprockets 27$^a$ on the hubs 27.

It will be noted that, by the construction shown and described, a straight-line drive is provided between the shafts 22 in the upper series and the shafts 26 in the lower series; also that a balanced drive of all of the shafts is provided by reason of the engagement of the side chain members with the side sprockets on the hubs 27 and the engagement of the middle chain member with the centrally located sprockets on the hubs 25. This arrangement insures smoothness of drive, with an economical and efficient installation. A contributory factor to the smoothness of drive is the fact that the side chain members lead from the side driving sprockets 18$^b$ to the first sprockets 27$^a$ in the lower train of sprockets and lead from the last sprockets of the lower train of sprockets to the side sprockets of the drive sprocket.

The construction shown and described herein is particularly applicable for use in driving rolls operating upon sheet metal, the drive possessing ample strength for accomplishing this object when the rolls are operated at the speeds customarily employed therewith.

Figure 4:
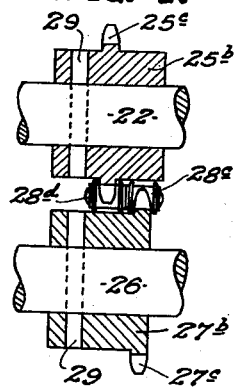

In Fig. 4 there is shown a modification of the drive illustrated in Figs. 1—3, wherein a double sprocket chain is employed, driven by a double hub (not shown). In this modification, each upper sprocket hub 25$^b$ is provided with a single sprocket 25$^c$ adjacent to its pin 29, while the sprocket hub 27$^b$ is provided with a sprocket 27$^c$ adjacent to the end thereof opposite its pin 29. The sprockets 25$^c$ and 27$^c$ are arranged so that the teeth thereof will be simultaneously engaged by the links of the sprocket chain members 28$^c$, 28$^d$.

With this construction, the chain members 28$^c$ and 28$^d$ are engaged simultaneously and respectively by sprocket teeth 25$^c$ and 27$^c$, whereby the upper and lower series of sprockets are driven.

Figure 5:
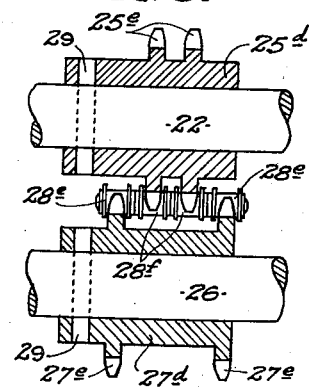

In Fig. 5 there is shown a further modification of my invention, wherein the upper sprocket hubs 25$^d$ are provided each with two centrally arranged sprockets 25$^e$, while each lower sprocket hub 27$^d$ is provided with sprockets 27$^e$ arranged adjacent to opposite ends thereof. The sprocket teeth on the two hubs are arranged so that the teeth thereof will be simultaneously engaged by the sprocket chain members, four of which are shown, the two outermost chain members $28^e$ engaging the teeth on the sprockets $27^e$ while the two intermediate sprocket chains $28^f$ engage the teeth on the sprockets $25^e$. This arrangement also secures a balanced drive, such as is obtainable by the construction shown in Figs. 1—3.

Figure 6:
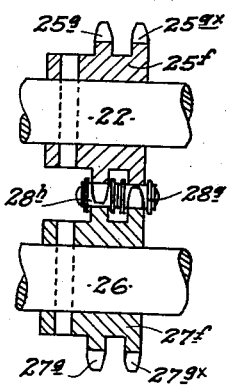

In Fig. 6 there is shown a modification of my invention wherein only two sprocket chain members $28^g$ and $28^h$ are employed and wherein the sprockets $25^g$ and $25^{gx}$ on the hubs $25^f$ and the sprockets $27^g$ and $27^{gx}$ on the hubs $27^f$ are so arranged that the teeth on the sprockets $25^g$ are alined with the teeth on the sprockets $27^g$ while the teeth on the sprockets $25^{gx}$ are alined with the teeth on the sprockets $27^{gx}$. With this arrangement, the links of the chain members $28^g$ and $28^h$ are engaged simultaneously by the teeth of the sprockets $25^g$ and $27^g$ and also simultaneously by the teeth on the sprockets $25^{gx}$ and $27^{gx}$, the engagement of the chain members by the teeth of the sprockets $25^g$ and $27^g$ alternating with the engagement of the chain members by the teeth of the sprockets $25^{gx}$ and $27^{gx}$.

Figure 7:
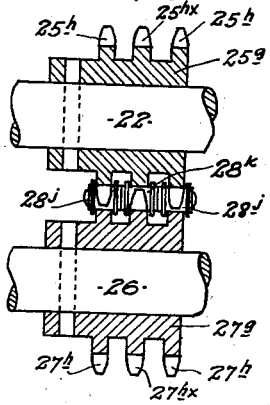

In Fig. 7 there is shown a further modification, wherein each sprocket hub $25^g$ is provided with two externally arranged sprockets $25^h$ and an intermediate sprocket $25^{hx}$ and each sprocket hub $27^g$ is provided with two externally arranged sprockets $27^h$ and an intermediate sprocket $27^{hx}$. The teeth on the sprockets $25^h$ are transversely alined with the teeth on the sprockets $27^{hx}$ and the teeth on the sprockets $25^{hx}$ are alined with the teeth on the sprockets $27^h$. With this arrangement, the links of the outer chain members $28^j$ and $28^k$ are engaged simultaneously by the teeth on the sprockets $25^h$ and $27^{hx}$ and also simultaneously by the teeth on the sprockets $27^h$ and the teeth on the sphocket $25^{hx}$, the engagement of the chain members by the teeth on the sprockets $25^h$ and $27^{hx}$ alternating with the engagement of the chain members by the teeth on the sprockets $25^{hx}$ and $27^h$.

Figure 8:
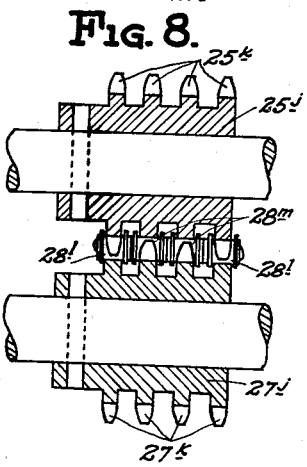

In Fig. 8 there is shown a still further modification of my invention which differs from that shown in Figs. 6 and 7 in that the sprocket hub $25^j$ is provided with four sprockets $25^k$ and the sprocket hub $27^j$ is provided with four sprockets $27^k$ while the chain comprises four members, namely, two side members $28^l$ and two intermediate members $28^m$. The teeth on the sprockets are so arranged that links in the two side chain members will be engaged simultaneously by teeth on each of the two side sprockets on each hub while the two intermediate side chain members are engaged simultaneously by the teeth on the intermediate sprockets of each hub.

The construction described in Figs. 6, 7 and 8 affords a balanced drive between the sprockets on the shaft 22 and those on the shafts 26, since one or more teeth on each of the sprockets are always in mesh with the chain. This insures smoothness as well as quietness of driving.

Figure 9:
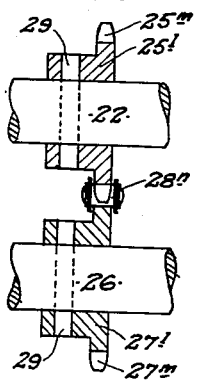

In Fig. 9 I have shown a construction wherein the shafts 22 and 26 may be driven by single sprockets and a single chain. In this view, each sprocket hub $25^l$ and $27^l$ is provided with a single sprocket $25^m$ and $27^m$, respectively, the teeth on one sprocket alternating with the teeth on the other sprocket. This enables me to use a single chain $28^n$, the links whereof are adapted to be engaged alternately by the teeth on the sprockets $25^l$ and $27^l$.

Figure 10:
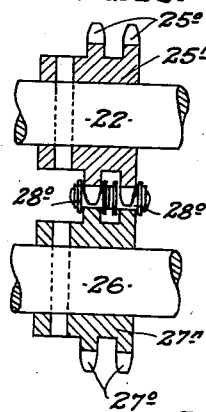

In Fig. 10, I have shown a modification which differs from that shown in Fig. 9 only in the substitution of double sprockets $25^o$ and $27^o$ on the hubs $25^n$ and $27^n$ for the single sprockets shown in the hubs in the preceding view and also in the substitution of two chain members $28^o$ for the single chain member $28^n$ in the former view. The teeth on the sprockets $25^o$ are arranged to alternate with the teeth on the sprockets $27^o$ in engaging the links of the chain members $28^o$.

Figure 11:
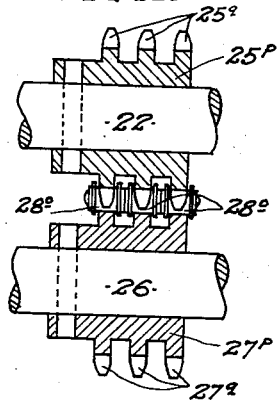

The construction shown in Fig. 11 differs from that shown in Fig. 10 in the employment of hubs $25^p$ and $27^p$ each having three sprockets $25^q$ and $27^q$, respectively, thereon and the employment therewith of three chain members $28^o$, the teeth on the sprockets being so arranged that the links on the chain members $28^o$ will be alternately engaged by three teeth on each of the sprockets $25^p$ and $27^p$.

Figure 12:
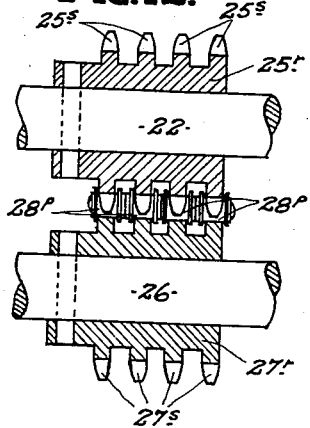

The modification shown in Fig. 12 differs from that shown in Fig. 11 only in the employment of four sprockets $25^s$ and $27^s$ on each of the hubs $25^r$ and $27^r$, respectively, for the three sets of sprockets shown in the preceding view, and in the substitution of four chain members $28^p$ for the three chain members shown in the preceding view. The teeth on the sprockets $25^s$ alternate with the teeth on the sprockets 27 in engaging successively the links of the chain members $28^p$.

It will be evident that, in addition to the advantages pointed out hereinbefore, my driving mechanism will effect a material reduction in power cost, due to the absence therein of any idler and reversing shafts and the gears thereon.

Having thus described my invention, what I claim is:

1. In a sheet metal forming machine, the combination of a series of aligned shafts, a second series of aligned shafts arranged parallel with and adjacent to the first series with the shafts of one series arranged directly opposite the shafts of the other series, a sprocket hub carried by each of said shafts, widely spaced sprockets carried by each of the hubs of one of said series of shafts, one or more sprockets carried by each of the hubs of the other series of shafts and arranged so as to be interposed intermediately of the first mentioned sprockets, a driving shaft, a sprocket hub thereon having sprockets spaced to cooperate with the sprockets on the first mentioned shafts, and a sprocket chain comprising sprocket-chain members driven by the sprockets on the last mentioned hub and extending between and engageable by the sprockets on the hubs of the first mentioned shafts.

2. In the combination recited in claim 1, the series of shafts having the widely spaced sprockets on the hubs thereof being interposed between the driving shaft and the other series of shafts whereby the sprocket chain members driven by the widely spaced sprockets on the driving shaft hub will be engaged by and extend partially around the like spaced sprockets on the hubs of the first and last shafts in the series of shafts adjacent to the driving shaft.

PAUL A. ABRAMOSKA.